United States Patent [19]

Miller

[11] Patent Number: 4,524,734
[45] Date of Patent: Jun. 25, 1985

[54] APPARATUS AND METHOD FOR ENGINE PRELUBRICATION

[75] Inventor: Thomas J. Miller, Palos Heights, Ill.

[73] Assignee: Topline Automotive Engineering Inc., Chicago, Ill.

[21] Appl. No.: 581,959

[22] Filed: Feb. 21, 1984

[51] Int. Cl.³ .............................................. F01M 1/12
[52] U.S. Cl. ............................ 123/196 S; 123/196 R; 123/198 D; 184/6.4
[58] Field of Search ........... 123/196 R, 196 S, 198 D; 184/6.5, 6.3, 6.4, 1.5

[56] References Cited

U.S. PATENT DOCUMENTS

| | | | |
|---|---|---|---|
| 3,556,070 | 12/1971 | Holcomb | 123/196 S |
| 3,722,623 | 3/1973 | Waldecker | 123/196 S |
| 4,061,204 | 12/1972 | Kautz, Jr. | 123/196 S |
| 4,094,293 | 6/1978 | Evans | 123/196 S |
| 4,112,910 | 9/1978 | Percy | 123/196 S |
| 4,168,693 | 9/1979 | Harrison | 123/196 S |
| 4,359,140 | 11/1982 | Shreve | 123/196 S |

FOREIGN PATENT DOCUMENTS 219884  10/1957  Australia ............................... 184/6.3

Primary Examiner—E. Rollins Cross
Attorney, Agent, or Firm—McDougall, Hersh & Scott

[57] ABSTRACT

Apparatus and method for prelubricating newly built, overhauled or rebuilt, and repaired engines including a relatively compact and lightweight pressurized vessel containing a predetermined volume of a light grade prelubricant which may, preferably, be of a specialized or proprietary formulation. The vessel is pressurized with carbon dioxide which serves as the propellant to force the lubricant through an adjustable metering valve on the vessel, an interconnecting hose and, in turn, into an engine oil port wherein the pressurized prelubricant is distributed through existing engine oil passageways, channels, and galleys.

5 Claims, 3 Drawing Figures

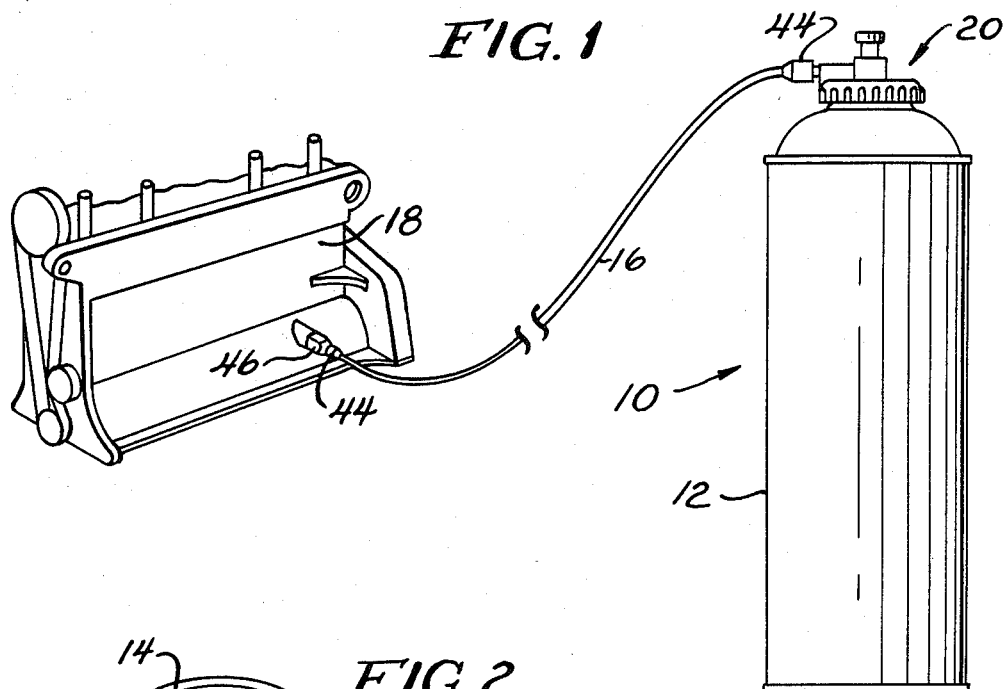
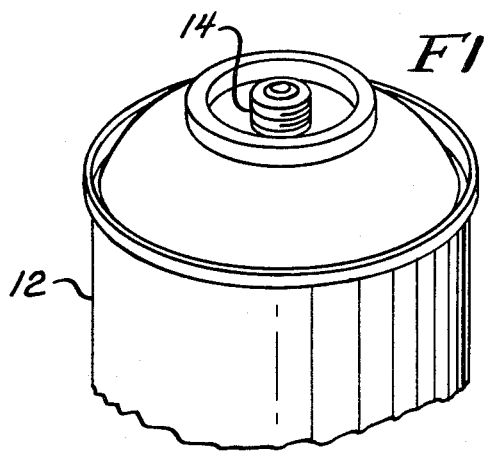
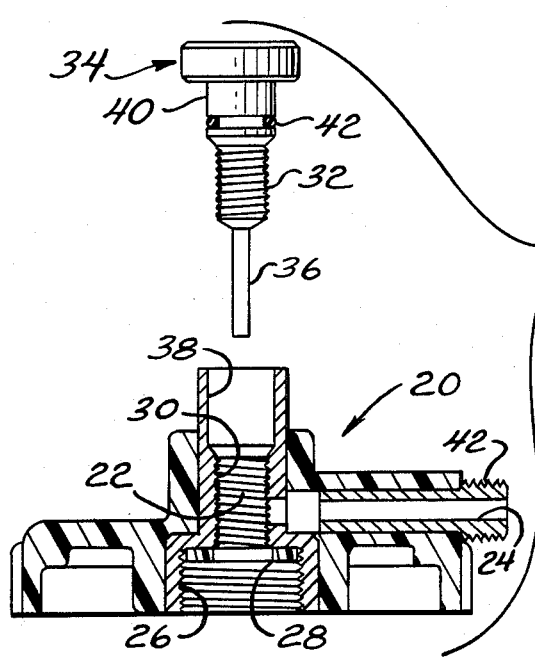

APPARATUS AND METHOD FOR ENGINE PRELUBRICATION

The present invention relates to engine lubrication and, more specifically, to apparatus and method of prelubricating new or rebuilt engines prior to first use. It is well known that operation of an engine without sufficient oil circulation or lubrication of all moving parts, even for extremely short durations, results in severe wear, if not complete malfunction and total engine destruction. During periods of normal engine usage, a thin residual oil film remains on the various components following engine shut-down and serves to initially protect the engine against excessive wear until normal oil pressure and circulation can be reestablished upon engine restart.

This protective residual oil coating may be insufficient or wholly absent from newly manufactured, remanufactured, or overhauled engines. The present invention, therefore, is directed to a method and apparatus for distributing lubricant throughout the engine prior, and without need, to operate the engine. In this manner, the engine will be adequately lubricated prior to initial operation thereby eliminating the danger of premature part wear and engine malfunction commonplace with engine 'dry-starting'. More specifically, the present apparatus comprises a compact, lightweight, and comparatively inexpensive aerosol-type pressurized vessel adapted for storage and propulsion of engine prelubricant.

Engine prelubrication is known to the prior art. One common prelubrication technique utilized to avoid engine dry-starting is to coat each engine moving part with lubricant or grease during engine assembly. It will be appreciated, however, that this technique is both time consuming and messy and, further, does not assure coverage of all components. In addition, the effectiveness of prelubrication diminishes with aging and, therefore, rebuilt engines stored for considerable periods may be effectively unprotected. The present invention facilitates prelubrication immediately before engine start-up without regard to the preceeding storage duration.

One known apparatus for engine prelubrication is the Federal-Mogul Engine Prelubricator, model T-100. This apparatus includes a comparatively large and bulky prelubricator oil storage/pressure tank in which the user adds up to 10 quarts of prelubricant and, further, requires a motor operated air-compressor to pressurize the prelubricant tank and force liquid prelubricant therefrom. While proper engine prelubrication can be achieved utilizing this apparatus, the Federal-Mogul system has several significant drawbacks which have been overcome by the present invention including its relative bulk and comcomitant lack of portability, its need for an external source of pressurized air, its substantial cost, and the requirement to add engine prelubricant.

The present apparatus, by comparison, is an inexpensive, lightweight, and completely portable prelubricator requiring no external air source or other equipment. Further, it contains a predetermined quantity of prelubricant sufficient to properly lubricate a single engine without the attendant uncertainty or waste common with known prelubricators. Finally, a prelubricant blend having specialized additives to inhibit oxidation, corrosion, and rust, and to enhance lubricity and viscosity may be selected by the manufacturer according to its expertise and the specific intended prelubrication applications. Thus, end-users need not be concerned with such technical matters nor be faced with a large capacity tank filled with an inappropriate lubricant for the specific new application.

To these ends, a premeasured quantity of lubricant and additives is retained in a compact aerosol-type container or can having a threaded metering valve cap on the top thereof. The can is maintained under high gas pressure; the pressurized gas serving as a self-contained propellant vehicle. An adjustable metering valve and cap assembly screwed to the valve opening, a hose, and an engine crankcase coupling define the path of prelubricant flow. The present prelubricator is extremely easy to use requiring, merely, connection to the engine, typically at the oil pressure gauge outlet. The adjustable metering valve is opened thereby permitting the premeasured contents from the pressurized can to empty into the engine through its preexisting engine oil channels.

Heretofore, the complexity and expense of prelubrication apparatus has effectively restricted its use to well equipped service and repair stations. The small size of the present apparatus, however, ideally suits it for use in a variety of locations, including field locations in which it might otherwise be impractical, if not impossible, to transport and power prior art prelubricators. Further, the use of limited, premeasured quantities of prelubricant in an apparatus of relatively simple, inexpensive design renders the present invention ideally suited for use by weekend mechanics as well as those desiring to guard against the dangers of dry-starting. Thus, it is now practical and economical to prelubricate where only limited engine repairs have been undertaken.

It is therefore an object of the present invention to provide a method and apparatus for prelubricating engines. The apparatus shall be of relatively straight forward design and complexity such that it can economically be utilized by service stations and individuals alike. It is, therefore, a further object that apparatus not include large or expensive components such as would normally discourage its purchase by persons having only limited, occasional need therefor. It is an object that the apparatus shall be lightweight and portable permitting its use in the garage, driveway, or wherever and whenever the repair of engine parts becomes necessary. The prelubricator should preferably contain a limited, premeasured quantity of lubricant adapted for complete discharge during first use. It is a further object that the lubricant be a selected mixture specially suited for prelubrication. More specifically, it is an object that the lubricant contain additives to minimize deleterious effects of oxidation, corrosion, and rust as well as additives enhancing lubricity and viscosity. It is an object that the prelubricant be retained in a pressurized can wherein the internal can pressure serves to propel the prelubricant during use. It is a further object that an adjustable metering valve, hose, and fitting interconnects the pressurized prelubricant can with the engine oil channels, passageways and galleys.

These and other objects will be apparent from the specification and drawings in which:

FIG. 1 is an elevation view of the prelubricator of the present invention interconnected to an overhauled engine shown in prespective;

FIG. 2 is a perspective view of the upper portion of the pressurized prelubricant can showing the threaded metering valve stem; and, FIG. 3 is an elevation view, with portions broken-away, of the adjustable metering valve cap with the adjustment plunger screw removed to reveal the details thereof.

DESCRIPTION OF THE PREFERRED EMBODIMENT

Referring to FIGS. 1 and 2, the prelubricator of the present invention, shown generally at 10, includes a highly pressurized prelubricant container 12 having a metering valve (not shown) positioned inside a threaded valve stem 14. The container is initially precharged with a premeasured quantity of lubricant, for example 24 ounces, generally sufficient to lubricate a single engine. Thus, in normal use, the entire contents of the can will be discharged and the can thereafter discarded.

A lightweight lubricant must be used to facilitate passage throught the relatively long and narrow conveyance tube 16 and, further, proper distribution to all moving parts of the engine 18. Grade 120 SAS (at 100° F.) is satisfactory. The lubricant may advantageously comprise a special or propriety blend of additives adapted to engine prelubrication, for example, anti-oxidizers, metal protectors, corrosion inhibitors, rust preventatives and other additives to enhance lubricity. It will be appreciated that the present self-contained and non-refillable lubricator permits the manufacture to provide a superior prelubricant product without having to reveal to the ultimate user the precise chemistry thereof.

The remaining volume of can 12 is filled with pressurized carbon dioxide preferably in excess of 110 psi. This gas serves as the propellant to force the lubricant from can 12, through interconnecting hose 16, and, in turn, throughout the various oil passages, galleys, and channels of the engine requiring prelubrication. In this manner, complete prelubrication of an engine is achieved without relatively large and cumbersome pressure tanks and, importantly, without recourse to external air compressors. The pressurized prelubricant is retained within the can until released through the metering valve in stem 14 as described below.

FIG. 3 illustrates the metering valve actuator cap shown generally at 20. Cap 20 includes a vertical channel 22 and an intersecting lateral channel 24. Internal threads 26 adapted to mate with complementary stem threads 14 are provided along the lower portion of vertical channel 22. In this manner cap 22 is securely affixed to can 12 adjacent the metering valve. The diameter of the channel 22 bore is reduced above threads 26 to form an annular surface against which a washer 28 is positioned to assure air-tight communication between the can and cap 20.

The central region 30 of channel 22 is also threaded to receive complementary threads 32 of thumb adjuster 34. Angular rotation advances adjuster 34 in conventional fashion along the vertical channel axis thereby raising or lowering the actuator pin 36 integrally affixed to adjuster 34. Downward movement of pin 36 progressively opens the metering valve through which the lubricant is expelled from the can. Conversely, retracting the adjuster and the actuator pin sufficiently in the upward direction causes the metering valve to close thereby precluding the escape of prelubricant.

The upper bore region of channel 22 defines a cylinder 38 adapted to receive the piston-like portion 40 of adjuster 34. More specifically, a rubber O-ring 42, positioned in an annual slot formed in piston 40, is tightly received for slideable axial movement within cylinder 38. In this manner, the top of channel 22 is sealed against loss of lubricant or propellant. The lateral channel 24 intersects the central region 30 of the vertical channel generally at the lower part thereof so that free liquid and gas communication is maintained between the channels for all positions of the actuator 34. The intersection of channels 22 and 24 form an air-tight seal therebetween and, preferably, define a single integral member. Threads 42 are provided on the outwardly extending end of lateral channel 24 for connection of conveyance hose or tube 16.

Conveyance hose 16 is preferably a flexible plastic tube of approximately ⅛ inch diameter and of suitable length to facilitate connection to an engine crankcase oil pressure sensor outlet. Six feet is generally sufficient. A small air-tight threaded connector 44 is provided on each end of hose 16. This connector mates directly with the threaded end 42 of channel 24 and, with an appropriate washer, forms an air-tight seal between the hose and metering valve cap 20. An interface adapter 46 is required to transition from the small hose fitting 44 to the larger ½ inch fitting commonly found on pressure sensor outlets.

In operation, the several components are assembled as described and shown in FIG. 1 to form an overall gas/liquid-tight seal between can 12 and engine 18. Next, the metering valve is opened by rotating actuator 34 in the clockwise downward direction. The valve may be partially opened or, to obtain maximum pressure and oil distribution throughout the engine, the valve is preferably opened fully. At this instant, prelubricant under high pressure is propelled from can 12, through cap 20 and hose 16, and, in turn, into the engine oil pressure outlet. By reason of its light-weight and the high propellant pressure, the prelubricant easily passes through the various passageways, channels, and galleys defining the conventional engine lubrication system thereby prelubricating all engine moving parts without the engine damage occasioned by dry-engine operation.

The metering valve may be closed following full prelubrication of the engine; although, typically, only a limited and premeasured quantity of prelubricant sufficient for the prelubrication of a single engine will be provided. In this manner the entire contents of the can are discharged with any engine prelubrication and the can discarded. The screw-type connection of cap 20 and hose 16 with can 12 facilitates reuse of the prelubrication apparatus merely by replacing the expended pressurized can. Thus, by using a pre-measured lubrication can, the user need not be concerned with prelubrication duration or encounter engine damage due to insufficient prelubrication.

I Claim:

1. Apparatus for prelubricating engines including a portable pressure containment vessel having a valve therein; a premeasured volume of prelubricant of predetermined formulation in the vessel; a compressible propellant in the vessel, the quantity of said propellant defining a minimum initial vessel pressure; valve actuator means; means for attaching the actuator means to the vessel in air-tight relationship to the valve means; hose means adapted to interconnect the valve actuator means and an engine requiring prelubrication whereby the prelubricant is discharged throughout an engine upon opening the actuator means.

2. Lightweight portable apparatus for prelubricating engines including a portable pressure containment can having a valve therein; between about 5 and about 50 ounces of prelubricant in the can, the prelubricant having a predetermined formulation; propellant in the can sufficient to discharge the prelubricant from the can and to define a minimum initial can pressure; valve actuator means; means for attaching the actuator means to the can in air-tight relationship to the valve means; hose means adapted to interconnect the valve actuator means and an engine requiring prelubrication whereby the entire prelubricant contents of the can may be discharged to fully prelubricate an engine.

3. Lightweight portable apparatus for prelubricating engines including a disposable pressure containment can having a valve therein; between about 5 and about 50 ounces of prelubricant in the can, the prelubricant having a predetermined formulation; propellant in the can sufficient to discharge the prelubricant from the can and to define a minimum initial can pressure; valve actuator means; means for detachably mounting the actuator means to the can in air-tight relationship to the valve means; hose means adapted to interconnect the valve actuator means and an engine requiring prelubrication whereby a discharged disposable prelubricant can may be replaced following engine prelubrication.

4. The engine prelubricating apparatus of claim 3 wherein said minimum initial can pressure is about 100 psi.

5. An inexpensive method for prelubricating new, rebuilt and remanufactured, and repaired engines including the steps of filling a lightweight portable pressure can having an actuable valve therein with a premeasured volume of prelubricant, the prelubricant having a predetermined formulation; charging the pressure can with a compressible propellant to a minimum initial can pressure; attaching an interconnecting hose and valve actuator to the pressure can; attaching the other end of the interconnecting hose to an lubrication inlet on the engine to be prelubricated; opening the valve actuator thereby permitting the contents of the can to enter and lubricate the engine.

* * * * *